Patented Dec. 28, 1937

2,103,735

UNITED STATES PATENT OFFICE 2,103,735

METHOD OF ISOLATING THE FOLLICLE HORMONE FROM THE URINE OF PREGNANT INDIVIDUALS

Walter Schoeller, Berlin-Westend, Germany, Erwin Schwenk, New York, N. Y., and Friedrich Hildebrandt, Hohen Neuendorf, near Berlin, Germany, assignors to Schering-Kahlbaum A. G., Berlin, Germany No Drawing. Application January 30, 1934, Serial No. 708,966. In Germany January 31, 1933

10 Claims. (Cl. 260—131)

This invention relates to hormones and more particularly to a method of isolating the follicle hormone from the urine of pregnant individuals and similar starting materials.

It has for its object to provide means whereby the isolation of the hormone in comparatively pure form from its starting materials is effected in a simple and cheap manner.

Hitherto the follicle hormone has been separated from the urine of pregnant individuals by more or less complicated methods which in general are based upon the extraction with suitable solvents. But all these methods do not lead directly to crystalline products, but require further treatment whereby losses are incurred.

According to this invention especially good yields of follicle hormone are obtained by causing reagents for ketonic compounds to act upon the urine containing hormones or the extracts obtained therefrom, or from other sources, such as placenta or other organs or vegetable matter or the like, separating the reaction products from those compounds which did not react with said reagents, and splitting off the hormone from the condensation products. The splitting off may be accomplished, for instance, by boiling said condensation product with dilute acids or by double decomposition by means of suitable aldehydes, such as formaldehyde or benzaldehyde, or ketones.

The solutions constituting the starting materials are crude in that the amounts of the follicle hormones present are very small, and there are present large amounts of other substances such as various inorganic salts, a number of organic compounds of different types, coloring matter, phenolic bodies, sediment, urates, phosphates and the like. The solutions are treated in accordance with the present invention without purification or at the most by preliminarily treating the solution by such simple physical methods as filtration, which removes only the insoluble matter, or steam distillation, which removes only phenolic bodies, leaving most of the impurities still in the solution.

The term "reagents for ketonic compounds" as used hereinafter in the specification and in the claims annexed hereto includes all those compounds which form derivatives of the ketonic group by condensation, such as hydroxylamine, hydrazines, semicarbazide, thiosemicarbazide, aminoguanidine, their substitution products and the like.

The following examples serve to illustrate the present invention without, however, limiting the same to them.

*Example 1*

1 gram of semicarbazide, dissolved in acetic acid is added to 1 l. of urine of pregnant individuals, freed by filtration of its insoluble impurities and the mixture is allowed to stand for 2 to 3 days. Thereafter most of the ketones are precipitated in the form of gray-brown flakes, the latter representing the semicarbazones of the ketonic substances present in the urine, especially of the follicle hormones. Kieselguhr is added to the reaction mixture which is filtered. The crude product obtained is boiled with alcoholic hydrochloric acid, the decomposition mixture is diluted with water and is exhaustively extracted by means of ether. On evaporation of the ether a somewhat smeary, brownish mass is obtained which is intermingled with crystals. On further purification a highly effective crystalline follicle hormone is obtained.

*Example 2*

An extract obtained from the urine of mares in the advanced state of gestation which has been concentrated by evaporation and which contains 500,000 mouse units per gram is steam-distilled, the residue from the steam-distillation is dissolved in alcohol and mixed with a solution of hydroxylamine acetate. The reaction mixture is boiled for three hours and worked up in the customary manner. A mixture of oximes is obtained in the form of an oily brownish mass containing the same amount of mouse units as the original hormone extract but in a highly concentrated form. By splitting off the oximes a crystalline highly effective follicle hormone is obtained.

Various specific reagents for ketonic compounds are described in the book by Houben, entitled "Methoden der Organischen Chemie", third edition, vol. 2, pages 572–577. The use of a ketonic compound having a greater affinity of the ketonic reagents, is described in the book by Hans Meyer, entitled "Analyse und Konstitutionsermittlung Organischer Verbindungen" page 441.

Various changes may be made in the details disclosed in the foregoing specification without departing from the invention and from the principles set forth herein and in the claims annexed hereto. In the claims the term "animal and vegetable sources" is intended to include the urine of pregnant individuals or extracts obtained therefrom or from other sources, such as placenta or other organs or vegetable matter or the like.

What we claim, is:

1. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to the action of a reagent for ketonic compounds which is capable of forming condensation products with said hormones, and separating the reaction product.

2. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to the action of a reagent for ketonic compounds which is capable of forming condensation products with said hormones, separating the reaction product and splitting off the follicle hormone from the latter.

3. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to the action of a reagent for ketonic compounds which is capable of forming condensation products with said hormones, separating the reaction product and splitting off the follicle hormone from the latter by the action of dilute acids.

4. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to the action of a reagent for ketonic compounds which is capable of forming condensation products with said hormones, separating the reaction product and splitting off the follicle hormone from the latter by double decomposition with a compound taken from the class consisting of aldehydes and ketones of greater capability of reacting with said reagent for ketonic compounds than the hormone.

5. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to a steam distillation and then subjecting said starting material to the action of a reagent for ketonic compounds which is capable of forming condensation products with said hormones, and separating the reaction product.

6. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting the starting material to a preliminary steam distillation purification treatment, dissolving the pretreated material in an organic solvent, subjecting said starting material to the action of a reagent for ketonic compounds which is capable of forming condensation products with said hormones, and separating the reaction product.

7. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting the starting material to a preliminary steam distillation purification treatment, dissolving the pretreated material in an organic solvent, subjecting said starting material to the action of a reagent for ketonic compounds which is capable of forming condensation products with said hormones and separating the reaction product and splitting off the follicle hormone from the latter.

8. A method for isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to the action of a reagent taken from the class consisting of hydroxylamine and semicarbazide, and separating the reaction product.

9. A method of isolating follicle hormones which comprises providing a crude solution which has not been treated by chemical means to obtain a more concentrated solution of said hormones or to isolate the same in more or less purified state and containing a very small amount of follicle hormones together with a relatively large amount of other substances of diverse character which normally accompany the hormones in such crude solutions, subjecting said solution to a preliminary operation which at the most includes filtration to remove insoluble matter and distillation to remove volatile phenols, while allowing said substances to remain in said solution, treating said solution with a reagent for ketonic compounds which is capable of forming condensation products with said hormones and separating the reaction product from said solution.

10. A method of isolating follicle hormones which comprises providing a crude solution which has not been treated by chemical means to obtain a more concentrated solution of said hormones or to isolate the same in more or less purified state and containing a very small amount of follicle hormones together with a relatively large amount of other substances of diverse character which normally accompany the hormones in such crude solutions, treating said solution without preliminary purification thereof with a reagent for ketonic compounds which is capable of forming condensation products with said hormones and separating the reaction product from said solution.

WALTER SCHOELLER.
ERWIN SCHWENK.
FRIEDRICH HILDEBRANDT.